United States Patent [19]

Dube

[11] Patent Number: 5,407,616
[45] Date of Patent: Apr. 18, 1995

[54] METHOD FOR MAKING CYLINDRICAL PREFORMS

[75] Inventor: Darrell E. Dube, Akron, Ohio

[73] Assignee: E. I. Du Pont de Nemours and Company, Wilmington, Del.

[21] Appl. No.: 120,158

[22] Filed: Sep. 15, 1993

Related U.S. Application Data

[63] Continuation of Ser. No. 810,110, Dec. 19, 1991, abandoned.

[51] Int. Cl.6 .............. B29C 70/52; B29C 70/34; B29C 70/54
[52] U.S. Cl. .................... 264/40.1; 264/40.6; 264/40.7; 264/136; 264/137; 264/145; 264/257; 427/358; 427/430.1
[58] Field of Search ............ 264/328.2, 513, 257, 264/40.1, 145, 255, 259, 275, 288.4, 290.2, 292, 328.14, 328.14, 40.6, 40.7, 136, 137, 173; 427/358, 430.1

[56] References Cited

U.S. PATENT DOCUMENTS

| Re. 32,772 | 10/1988 | Hawley | 264/108 |
|---|---|---|---|
| 2,723,426 | 11/1955 | Pelley et al. | |
| 3,470,051 | 9/1969 | Meyer | 156/171 |
| 3,497,413 | 2/1970 | Ullman et al. | 156/425 |
| 3,790,651 | 2/1974 | Meitinger | 264/135 |
| 3,999,912 | 12/1976 | Hall | |
| 4,033,800 | 7/1977 | Ollis | 427/358 |
| 4,425,292 | 1/1984 | Kanotz | 264/174 |
| 4,470,941 | 9/1984 | Kurtz | 264/136 |
| 4,585,407 | 4/1986 | Silver et al. | 425/114 |
| 4,605,525 | 8/1986 | Baxter | 264/405 |
| 4,609,515 | 9/1986 | Smyth | 264/136 |
| 4,740,261 | 4/1988 | Moser | 156/244 |
| 4,746,386 | 5/1988 | Sato et al. | |
| 4,758,395 | 7/1988 | Zion | 264/135 |
| 4,772,438 | 9/1988 | Watanabe et al. | 264/25 |
| 4,790,257 | 12/1988 | Schermutzki | 118/227 |
| 4,790,737 | 12/1988 | Fukamachi et al. | 425/114 |
| 4,800,048 | 1/1989 | Bloomfield et al. | 264/22 |
| 4,808,439 | 2/1989 | Basfeld | 427/356 |
| 4,822,548 | 4/1989 | Hempel | 264/209 |
| 4,838,777 | 6/1989 | Weber | 425/114 |
| 4,864,964 | 9/1989 | Hilakos | 118/117 |
| 4,883,625 | 11/1989 | Glemet et al. | 264/136 |
| 4,937,028 | 6/1990 | Glemet et al. | 264/136 |
| 4,948,354 | 8/1990 | Minaudo | 425/114 |
| 4,966,637 | 10/1990 | Laborie | 156/47 |
| 4,966,637 | 10/1990 | Laborie | 156/47 |
| 4,976,599 | 12/1990 | Pepe | 425/131.1 |
| 5,089,201 | 2/1992 | Takahashi | 264/513 |
| 5,091,027 | 2/1992 | Watanabe | 264/257 |
| 5,098,496 | 3/1992 | Breitigam | 156/180 |
| 5,277,566 | 1/1994 | Augustin et al. | 264/136 |
| 5,294,461 | 3/1995 | Ishida | 264/136 |

Primary Examiner—Jan H. Silbaugh
Assistant Examiner—Angela Ortiz

[57] ABSTRACT

A method and apparatus is provided for generating a cylindrical composite preform. A tubular sleeve of cloth is maintained upon a mandrel which is passed through an injection chamber into which a thermosetting resin is injected. A small cavity within the resin injection chamber meters the resin into the cloth to assure complete and total impregnation thereof. The mandrel exits the resin injection chamber and enters an oven where the resin and fabric composite is B-staged. Subsequently, the composite sleeve is cut into appropriate lengths and removed from the mandrel for further processing for development of an end product.

8 Claims, 1 Drawing Sheet

U.S. Patent  Apr. 18, 1995  5,407,616
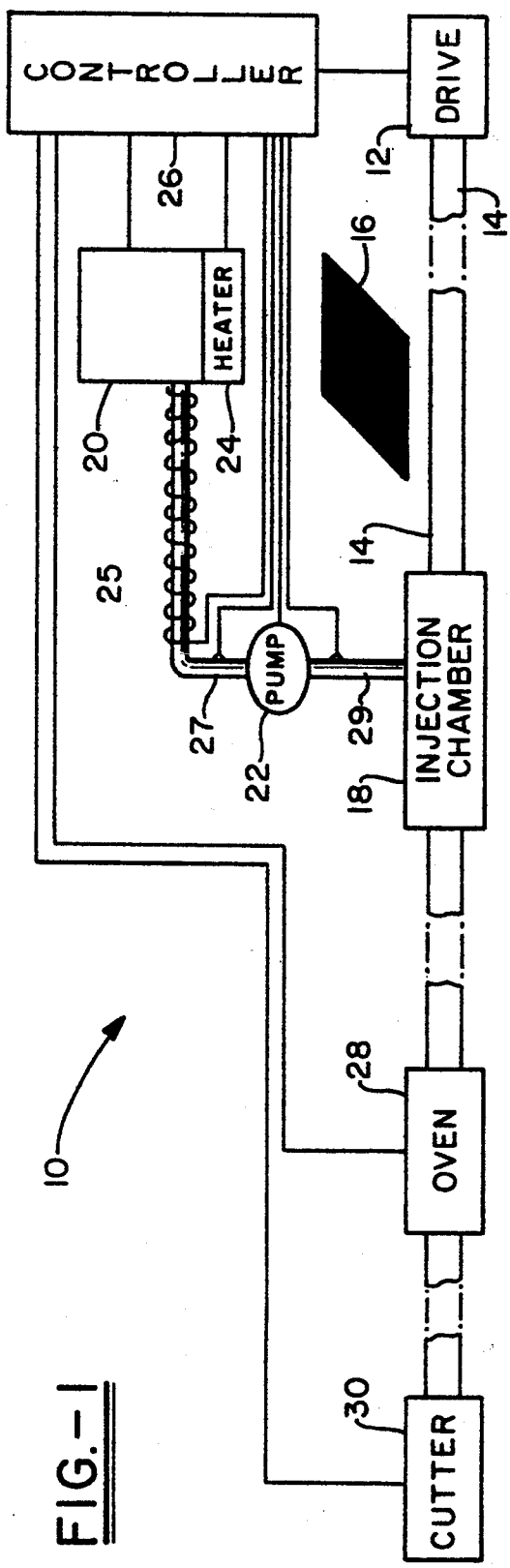
FIG.-1
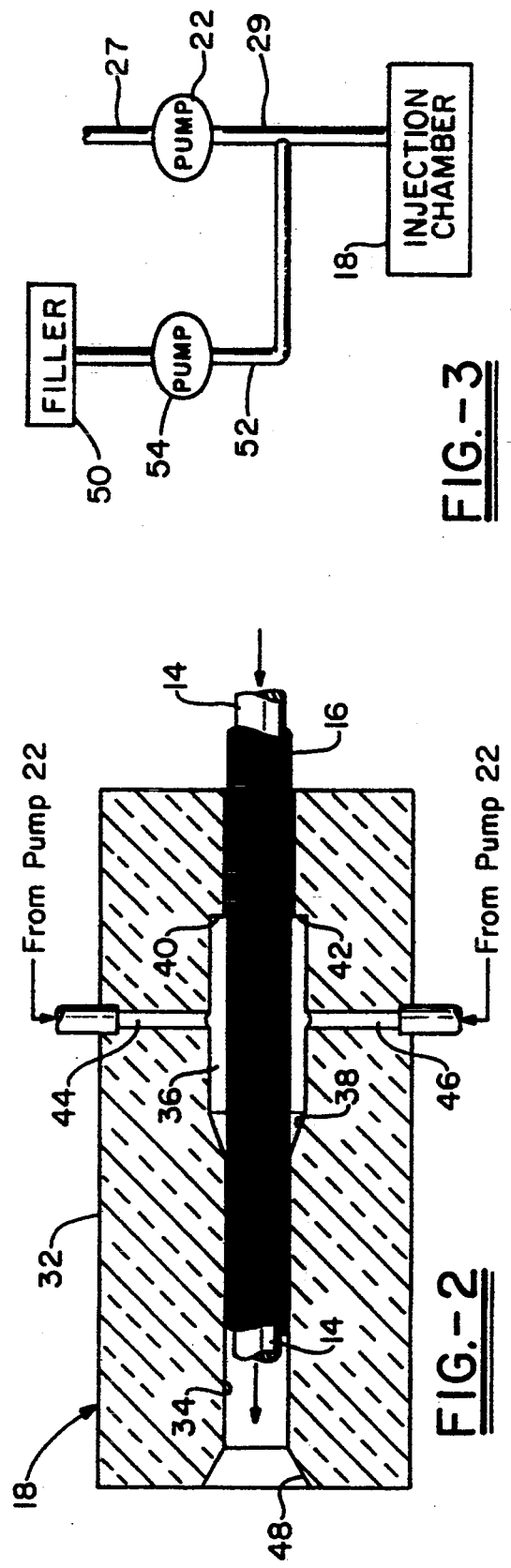
FIG.-3
FIG.-2

METHOD FOR MAKING CYLINDRICAL PREFORMS

This is a continuation of application Ser. No. 07/810,110 filed Dec. 19, 1991, now abandoned.

TECHNICAL FIELD

The invention herein resides in the art of methods and apparatus for impregnating a tubular braid of fibrous material with a resin to fabricate a preform. More particularly, the invention relates to the fabrication of tubular preforms for use as bearings, bushings, wear strips, and the like.

BACKGROUND ART

Presently, it is known to use high temperature reinforced composites as bearings, bushings, and the like, Such composites are typically formed by laminating layers of fibrous cloth to each other by means of an appropriate thermosetting resin. Such resin impregnates the cloth, surrounding the fibers thereof, and is cured by the application of heat for a given period of time. Of particular interest herein are composites wherein the fibers of the cloth are formed of carbon, glass, teflon, and the like, and wherein the resin is polymeric.

The manufacturing of a bearing or bushing from the laminates discussed above typically begins with the formation of an appropriate preform comprising one or more layers of cloth formed in a tubular fashion and impregnated with the polymeric resin. The preform is then used as the base for finishing the bearing or bushing. Generally, a single preform is sufficient for finishing the product, though the building up of additional composite layers is also contemplated.

Previously, the preforms of interest were made by stretching a length of tubular braid over a rigid tubular mandrel. Several such braid-covered mandrels would then be placed into a holding fixture. The retained mandrels and holding fixture would then be placed into a vacuum chamber containing a pool of resin of sufficient depth to coat a given length of the braid-covered mandrels. The mandrels would be suspended above the resin and within a vacuum to remove all air from the cloth or braid. After such air was removed, the cloth or braid-covered mandrels were immersed in the pool of resin for a period of time sufficient to allow the cloth or braid to saturate with the resin. The mandrels were then removed from the resin pool and held thereover for a period of time to allow excess resin to drip back into the pool. Each mandrel was then pulled through a wiper ring to remove all resin except that which would pass through the ring while being maintained upon and between the fibers of the braid. The removed resin, along with any loose fibers from the braid, were allowed to fall into the resin pool. The resin-impregnated tubular braids maintained on the tubular mandrels were then B-staged to make the resin rigid and removed from the mandrel. The rigid tube was then cut into predetermined lengths to serve as a preform for the subsequent steps in the production process of the bearing, bushing, or the like. Those skilled in the art will appreciate that the B-staging operation serves to remove a substantial amount of solvent from the resin, typically through the application of heat, to transform the resin from fluid to solid.

The prior art process presented above has been found to be slow and labor intensive. Further, it is given to contamination and waste of the costly resin, since the entire resin pool is subjected to a plurality of tubular braids upon the mandrels. Loose fibers and contaminates from each of the braids therefore access the entirety of the resin pool. Dependent upon the degree of contamination experienced, it is not uncommon for the entire pool of resin to be discarded following the dipping process.

The prior art has further demonstrated some inconsistencies in the impregnation of the cloth or fabric weave with the resin. The simple dipping and wiping process described above does not necessarily assure that complete penetration of the fibrous cloth by the resin is achieved. Additionally, exposure of the resin pool to vacuum and ambient air gives rise to evaporation of resin solvent, changing the solids content of the resin and decreasing the ability of the resin to uniformly impregnate the fabric weave.

DISCLOSURE OF INVENTION

In light of the foregoing, it is a first aspect of the invention to provide a method and apparatus for making tubular preforms which can be employed in an automated process, reducing the labor intensity of the prior art.

Still a further aspect of the invention is the provision of method and apparatus for making tubular preforms which is not given to the contamination and waste of costly resin as experienced in the prior art.

An additional aspect of the invention is the provision of a method and apparatus for making tubular preforms which achieves a uniform impregnation of the cloth or fabric weave with the resin.

Still another aspect of the invention is the provision of a method and apparatus for making tubular preforms which substantially reduces evaporation of solvent from the reservoir of resin solution.

Yet an additional aspect of the invention is the provision of a method and apparatus for making tubular preforms which is reliable and cost effective in operation, while being conducive to implementation with state of the art devices and techniques.

The foregoing and other aspects of the invention which will become apparent as the detailed description proceeds are achieved by a method for making a tubular composite preform, comprising: wrapping a fabric upon a mandrel; injecting resin into a chamber; and moving said mandrel through said chamber and impregnating said fabric with said resin.

Yet other aspects of the invention are attained by apparatus for forming tubular laminate preforms, comprising: a reservoir of resin; an injection chamber; first means for moving a mandrel carrying a fabric through said injection chamber; and second means interposed between said reservoir and injection chamber for passing resin from said reservoir to said injection chamber at a controlled rate and pressure.

DESCRIPTION OF DRAWING

For a complete understanding of the objects, techniques and structure of the invention reference should be made to the following detailed description and accompanying drawing wherein:

FIG. 1 is a schematic block diagram of a system for making a tubular composite preform according to the invention;

FIG. 2 is a cross sectional view of the resin injection chamber employed in the system of FIG. 1; and FIG. 3 is a schematic block diagram of a modification to the system of FIG. 1, showing the addition of filler to the resin prior to entry into the injection chamber.

BEST MODE FOR CARRYING OUT THE INVENTION

Referring now to the drawing and more particularly FIG. 1, it can be seen that a system for forming a tubular preform is designated generally by the numeral 10. The system 10 employs an appropriate drive mechanism 12 to receive a rod or mandrel 14 and to move the same axially from right to left as shown in the drawing. In a preferred embodiment of the invention, the drive mechanism 12 moves the tubular mandrel 14 past a cloth wrapping station or other area where a cloth 16 may be applied to the mandrel 14. While it is contemplated that the cloth 16 may be wrapped upon the mandrel 14, it is also contemplated that the cloth 16 may be previously formed in the shape of a sleeve and be pulled over the mandrel 14. In either event, the mandrel 14 is provided with a cloth woven of fibers such as carbon, teflon, glass, graphite, or the like, with the cloth being uniformly tensioned upon the mandrel 14.

The drive mechanism 12 urges the cloth-bearing mandrel 14 to an injection chamber 18 similar to a pultrusion die where the cloth is impregnated with an appropriate thermosetting polymeric resin maintained in a reservoir 20. While the specific method and structure employed for such application of resin will be discussed in detail later, suffice it to say that a pump 22 is interposed between the reservoir 20 and the injection chamber 18 for passing resin from the reservoir to the chamber. In a preferred embodiment of the invention, the pump 22 is a positive displacement pump so that the rate of flow of resin from the reservoir 20 to the injection chamber 18 is constant, uniform, and controllable.

Also provided in association with the reservoir 20 is a heater 24, provided to maintain the resin at a set operating temperature, such temperature being that found to be optimum for passage of the resin to the injection chamber 18 and for achieving the desired impregnation of the cloth 16. It is further contemplated that the resin may be heated as it passes from the reservoir 20 to the pump 22. To that end, a heater 25 engages the conduit 27 between the reservoir 20 and pump 22. This arrangement has the advantage of putting less heat into the resin prior to introduction into the injection chamber 18 and allows for excellent control of resin viscosity.

A controller 26, such as a dedicated microprocessor or the like, is provided in communication with the reservoir 20, heater 24, and pump 22. The controller 26 serves to monitor the temperature of the resin within the reservoir 20 and to appropriately activate the heater 24 to maintain the resin at a desired temperature. When a heater 25 is employed, the controller 26 may serve to monitor the temperature of the resin within the conduits 27 and/or 29 and appropriately activate the heater 25. Further, the controller 26 operates to control the pump 22 to assure that resin is injected into the injection chamber 18 at a rate and pressure sufficient to assure full impregnation of the cloth 16. This rate and pressure will be a function of the temperature of the resin as sensed by the controller 26, as well as the axial drive rate of the mandrel 14. For this reason, the controller 26 also controls the drive mechanism 12. Accordingly, the axial drive rate of the mandrel 14, the rate and pressure of dispensing of the resin by means of the pump 22, and the temperature of the resin are all monitored and controlled by the controller 26 to assure complete resin impregnation of the cloth 16. Those skilled in the art will readily appreciate the interrelationships between the resin temperature, resin flow rate and pressure, and the axial feed rate of the mandrel 14 to achieve full and complete impregnation.

As the mandrel 14 exits the injection chamber 18, bearing the tubular cloth 16 impregnated with resin, it is passed to an oven 28, the temperature of which may also be under control of the controller 26. The dwell time of the mandrel 14 within the oven 28, coupled with the temperature of the oven 28, assures an appropriate B-staging of the resin in the fabric composite. This B-staged composite is then passed to a culting station 30, where the composite sleeve is cut into predetermined lengths and removed from the mandrel or, alternatively, is first removed from the mandrel and then cut into such lengths. In either event, the end result is the presence of a plurality of composite preforms available for subsequent processing for the development of the end product bearing, bushing, or the like. As shown, the oven 28 and cutter 30 are also under control of the controller 26, to assure that the temperature of the oven 28 is sufficient to achieve the desired degree of B-stage at the thermosetting polymeric resin, and that the preforms are cut to appropriate lengths.

With reference now to FIG. 2, the specific physical structure of the injection chamber or pultrusion die 18 can be seen. As shown, a housing 32 is provided with an axial bore 34 passing therethrough. In a preferred embodiment of the invention, the housing 32 comprises a die cast acrylic rod, employed for being transparent and significantly impervious to effects from the polymeric resin employed in the process. A cavity 36 is interposed within the bore 34 and is coaxial therewith, being of a cylindrical nature of enlarged diameter with respect to the bore 34. The cavity 36 has a tapered wall 38, tapering at an angle of 10°-30°, and preferably 20°, with respect to the axis of the bore 34. It will be appreciated that the tapered wall 38 serves as a funnel to urge or meter resin maintained within the cavity 36 into the fabric 16 maintained upon the mandrel 14 as it passes from right to left as shown in the drawing. In other words, the tapered wall 38 is at the end at which the mandrel 14 exits the cavity 36. The other end of the cavity 36 is defined by a wall 40 which is substantially perpendicular to the axis of the bore 34, although a radiused corner 42 is provided to eliminate any sharp edges or the like which might interfere with the fabric 16. The wall 40 establishes the end of the cavity 36 through which the mandrel 14 enters the cavity. Of course, it will be appreciated that the mandrel 14 and bore 34 may be of various cross sectional geometries other than circular and remain within the scope of the invention.

Conduits 44, 46 communicate with the pump 22 to receive the flow of resin therefrom at a flow rate and pressure established by the controller 26. While only two such passages 44, 46 are shown in the cross sectional view of FIG. 2, it will be appreciated that any number of such passages may be employed to assure the uniform presence and pressure of resin within the cavity 36 as the mandrel 14 passes therethrough.

With further reference to FIG. 2, it can be seen that the bore 34 expands into an outwardly tapered opening 48 at the end thereof from which the mandrel 14 exits the bore 34 of the injection chamber 18. The walls of the opening are tapered on the order of 30°-45°, and preferably 40°, with respect to the axis of the bore 34, and serve to prevent snagging or interference with the impregnated cloth 16.

In a preferred embodiment of the invention, the total length of the cavity 36 is selected to provide sufficient exposure time for the pressurized resin to fully impregnate the fabric given the thickness and density of the fabric, the viscosity of the resin and the speed of the mandrel 14 through the bore 34 and impregnation cavity 36. It has further been found that the diameter of the bore 34 is substantially equal to the diameter of the mandrel 14 and the cloth 16, with sufficient tolerance being given to allow for movement of the mandrel and cloth through the bore 34. The actual metering of the resin into the cloth 16 is achieved by means of the pressure applied to the resin during the dwell time of the mandrel within the bore 34 as it communicates with the cavity 36, the tapered opening 48, the walls of the bore 34, and the tapered wall 38.

It should be appreciated that the portions of the bore 34 on either side of the cavity 36 serve as seals to prevent resin from escaping outwardly from the injection chamber 18. Accordingly, the right portion as shown in FIG. 2 may be shorter than the left portion since the former is upstream and the latter is downstream of the cavity 36 when considered with respect to the direction of movement of mandrel 14. To further assure that no resin escapes, the left portion of the bore 34 may be of a smaller diameter then the right portion, providing a tighter fit with the braid and mandrel 16, 14, thereby enhancing the sealing action through an interference fit. In any event, it will be appreciated that the primary purpose of the portions of the bore 34 on either side of the cavity 36 is to seal the ends of the injection chamber 18 from resin loss, and that impregnation of the braid 16 occurs within the cavity 36.

In the operation of the invention, braid 16 received upon the mandrel 14 enters the injection chamber 18 from the right as shown in FIG. 1. By matching the pressure of the resin within the cavity 36 with the speed of travel of the braid 16 upon the mandrel 14, the resin never escapes out of the bore 34 to the right as shown in the drawing. In other words, the speed of resin movement to the right is equal to the speed of mandrel movement to the left. On the left side of the injection chamber 18, the pressure of the resin must effectively drop to zero before the impregnated braid upon the mandrel 14 exists the bore 38. For this reason, the left side of the bore 34 is significantly longer than the right side with respect to the cavity 36.

It should also be appreciated that as the resin moves through the braid or cloth in the injection chamber 18, the resin forces air out of the interstices of the cloth or braid. The effect is similar to that achieved in the prior art using a vacuum, but without the adverse effect of prematurely removing solvent from the resin.

It is also contemplated as a portion of this invention that particulate fillers may be added to the resin after the resin leaves the reservoir 20 and before it reaches the injection or impregnation chamber 18. As shown in FIG. 3, a reservoir of filler 50 may be provided in communication with the conduit 29 through a conduit 52 and appropriate pump 54. In a preferred embodiment of the invention, the filler would comprise PTFE, graphite powder, or other appropriate compounds employed to reduce the coefficient of friction of the resin and/or to improve the wear life of the products produced from the system 10. As shown in FIG. 3, the filler 50 is simply driven by the pump 54 into the resin as it passes through the conduit 29 and immediately before entry into the injection chamber 18. This type of in-line addition allows the resin within the reservoir 20 to remain unmodified and avoids the need for continuous agitation of the resin to keep the filler particles in suspension. However, it is also contemplated as a portion of the invention that the particulate filler material may be added directly to the resin within the reservoir 20, obviating the need for the in-line addition as illustrated in FIG. 3.

It should now be appreciated that the resin exposed to the fabric 16 is that small quantity of resin which constantly occupies the cavity 36. Accordingly, contamination of the resin within the reservoir 20 is eliminated. Additionally, the temperature of the resin, flow rate and pressure of the resin into the cloth, and the rate of axial movement of the mandrel 14 may all be controlled by the controller 26 to assure complete and total impregnation of the cloth 16 with the polymeric resin. For example, should the temperature of the resin lower and/or then flow rate and pressure of the resin decrease, the drive mechanism 12 may be adjusted by the controller 26 to reduce the rate of axial movement of the mandrel 14. Indeed, any change in a system parameter sensed by the controller 26 may be compensated with appropriate adjustments of other parameters. Additionally, the closed system just described prevents solvent loss prior to impregnation, assisting in the control of resin viscosity.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. A method for making a cylindrical composite preform, comprising: wrapping a fabric upon a cylindrical mandrel forming a fabric covered mandrel; moving the fabric covered mandrel into a chamber having an inlet and outlet for said fabric covered mandrel to pass through, there being an interference fit formed with said fabric covered mandrel and said inlet and said outlet; injecting a polymeric resin under pressure into said chamber after said fabric covered mandrel is positioned in said outlet to force resin through the fabric; and moving said mandrel axially through said chamber and impregnating said fabric with said resin as said fabric covered mandrel moves axially through said chamber, said interference fit with said fabric covered mandrel and said inlet and said outlet form seals at said inlet and said outlet that allow movement of said fabric through said chamber, prevent resin from escaping from said chamber and maintain pressure in said chamber during said movement.

2. The method according to claim 1, further comprising the step of heating said resin within a reservoir prior to injecting the resin into said chamber and maintaining said resin within said reservoir at a predetermined temperature.

3. The method according to claim 2, further comprising the step of controlling a rate of injection of said resin into said chamber.

4. The method according to claim 3, further comprising the step of controlling a rate of movement of said mandrel through said chamber.

5. The method according to claim 4, wherein said steps of controlling said rate of injection of said resin and said rate of movement of said mandrel through said chamber are interdependent.

6. The method according to claim 5, wherein said steps of controlling said rates of injection and movement are further dependent upon said step of maintaining said resin at a predetermined temperature.

7. The method according to claim 6, further comprising the step of passing said impregnated fabric from said chamber to an oven for B-staging said resin, forming an elongated tubular preform.

8. The method according to claim 7, further comprising the step of cutting said elongated tubular preform into pieces of predetermined length and removing said preform from said mandrel.

* * * * *